United States Patent [19]

Rabinowitz et al.

[11] Patent Number: 5,631,448
[45] Date of Patent: May 20, 1997

[54] WEIGHING APPARATUS INCLUDING A MAGNIFIED, ILLUMINATED, MOVING INDICATOR

[75] Inventors: A. Jay Rabinowitz, Northbrook; Ivan Lestan, Winthrop Harbor, both of Ill.

[73] Assignee: Health O meter, Inc., Bridgeview, Ill.

[21] Appl. No.: 182,800

[22] Filed: Jan. 14, 1994

[51] Int. Cl.⁶ .................. G01G 23/30; G01D 11/28; H01H 9/00
[52] U.S. Cl. .......... 177/177; 177/182; 200/316; 200/317; 116/288
[58] Field of Search .................. 177/177, 178, 177/182; 362/23, 29, 30; 200/316, 317; 116/288

[56] References Cited

U.S. PATENT DOCUMENTS

| | | | |
|---|---|---|---|
| 2,081,827 | 5/1937 | Lohe | 200/316 |
| 2,812,422 | 11/1957 | Provi | 177/177 |
| 2,843,079 | 7/1958 | Hunter et al. | 177/177 |
| 2,892,010 | 6/1959 | Provi | 177/177 |
| 2,914,021 | 11/1959 | Blackwell et al. | 177/177 |
| 3,481,415 | 12/1969 | Hutchinson | 177/177 |
| 3,512,594 | 5/1970 | Grusin et al. | 177/178 |
| 3,655,003 | 4/1972 | Yamajima | 177/177 X |
| 3,776,176 | 12/1973 | Doyle | 116/129 |
| 4,030,559 | 6/1977 | Fish et al. | 177/182 X |
| 4,215,647 | 8/1980 | Fukasawa | 116/286 |
| 4,218,726 | 8/1980 | Fukasawa et al. | 362/23 |
| 4,258,643 | 3/1981 | Ishikawa et al. | 116/286 |
| 4,300,470 | 11/1981 | Furuhawa | 116/332 |
| 4,761,715 | 8/1988 | Brooks | 362/23 |
| 4,893,685 | 1/1990 | Bergman et al. | 177/174 |
| 5,003,914 | 4/1991 | Mayer | 116/332 |
| 5,040,480 | 8/1991 | Iwazaki et al. | 116/286 |
| 5,044,304 | 9/1991 | Tomita | 116/286 |
| 5,050,045 | 9/1991 | Kato et al. | 362/23 |

Primary Examiner—Michael L. Gellner
Assistant Examiner—Randy W. Gibson
Attorney, Agent, or Firm—Dick and Harris

[57] ABSTRACT

A weighing apparatus including a load receiving platform, a dial, and a moving indicator. The dial includes a face bearing various indicia for indicating the weight of a load placed upon the platform. A magnifier is operatively associated with the indicator for magnifying only a limited portion of the face of the dial in proximity to the indicator. A lamp, carried by the indicator, illuminates a limited portion of the face of the dial in proximity to the indicator. A switch actuates the lamp upon placement of a load upon the platform.

18 Claims, 1 Drawing Sheet

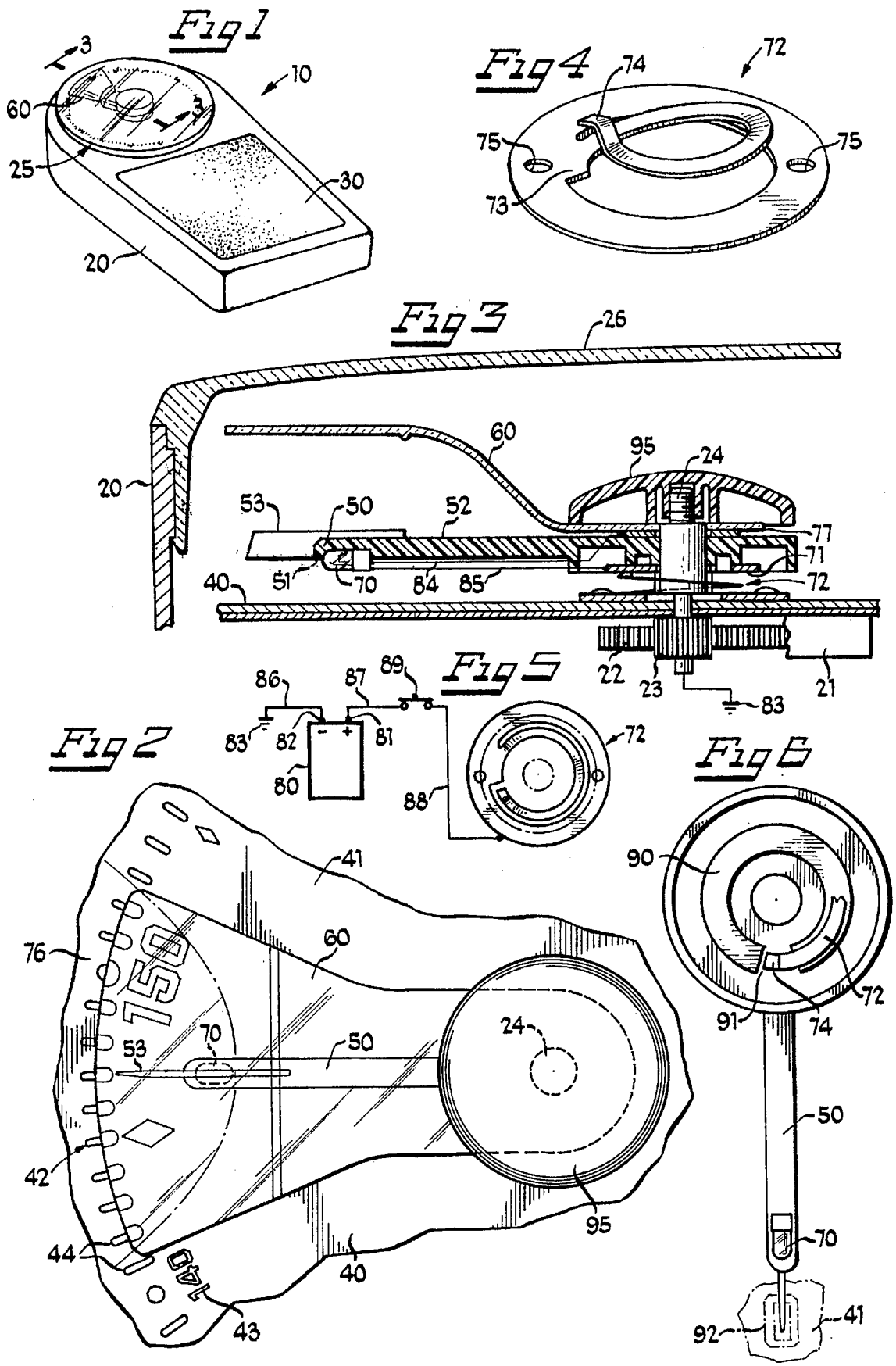

WEIGHING APPARATUS INCLUDING A MAGNIFIED, ILLUMINATED, MOVING INDICATOR

BACKGROUND OF THE INVENTION

The present invention relates to weighing apparatuses, and, more particularly, to facilitating reading of a weighing apparatus having a moving indicator.

Weighing apparatuses, such as bathroom scales, have been known in the art for many years. Such devices are employed to provide a visual indication of the weight of an object, such as a person, which is placed upon a load-receiving platform. One type of these weighing apparatuses commonly include a housing, a load-receiving platform, a weighing mechanism, a dial bearing various indicia, and an indicator for indicating specific dial indicia corresponding to the weight of a load placed upon the platform.

Two popular forms of bathroom scales are stationary dial scales and stationary indicator scales. Stationary indicator scales generally include a relatively small viewing region in the housing, with an indicator fixed in the center of the viewing region. The dial rotates in response to the placement of a load upon the platform, and eventually comes to rest with the indicia corresponding to the weight of the present load being visible below the stationary indicator. A magnifier, such as a clear plastic lens, is sometimes placed in a fixed position over the entire viewing region. The indicator is often integrated into the magnifier, such as by painting a stripe along the upper or lower surface of the magnifier. In addition, the viewing region is sometimes illuminated, such as by the placement of a light source near the relatively small viewing region.

Stationary dial scales generally include a relatively large viewing region in the housing, sometimes approximately equal in area to the size of the dial. The dial may be circular or arcuate in shape with the indicator extending from the approximate center of the dial outwardly, towards indicia placed near the circumference of the dial. When the platform is in a non-load bearing state, the indicator remains proximate to the "0" indicia. Upon placement of a load upon the platform, the indicator rotates, until the end of the indicator opposite the center of the dial comes to rest near the dial indicia which corresponds to the weight of the load.

Unlike stationary indicator scales, the configuration of stationary dial scales presents particular problems with respect to magnifying and lighting the dial indicia corresponding to the weight of a load placed upon the platform. The dial indicia of certain stationary dial scales, such as bathroom scale models, are often viewed from a significant distance, approximately the height of a user standing upon the platform. Accordingly, it is often desirable to magnify the viewing region of stationary dial scales.

However, magnification of the entire viewing region of a stationary dial scale is not as aesthetically pleasing as with magnifying the entire viewing region of a stationary indicator scale. Unlike with stationary indicator scales, which typically have relatively small viewing regions, magnification of the entire viewing region of a stationary dial scale does not serve to highlight only the specific indicia of the dial proximate to the present position of the indicator. Rather, the entire dial, including portions of the dial and indicia remote from the present position of the indicator, is visably enlarged whenever the entire viewing region is magnified.

The present invention overcomes the shortcomings of magnifying the entire viewing region of a stationary dial weighing apparatus. Rather, the present invention employs a novel magnifier for magnifying only a limited portion of the face of the dial in proximity to the indicator. This magnifier serves to highlight the specific indicia of the face of the dial near the position of the indicator.

Illuminated stationary indicator scales are well known in the art. In such scales, a light source is placed near the relatively small viewing region. Illuminated rotating indicators are also known in the art, particularly in the area of gauges for automobiles or the like. One shortcoming of such prior art devices is the requirement for an additional switch, to allow electricity to conduct to a lamp or other light source associated with the indicator, whenever the indicator is in operation. With respect to weighing apparatus, these switches are generally of the pressure-sensitive variety, activating upon the placement of a load upon the platform. With respect to prior art illuminated rotating indicators, these switches are generally manually operated, such as the ignition switch or "lights" switch of an automobile.

The present invention overcomes the prior art's requirement of an additional switch mechanism by incorporating the illumination control switch into conductive members used to electrically couple an illuminated rotating indicator to a power source. As a result, the present invention employs fewer components, and fewer moving parts, than prior art weighing apparatuses with illuminated rotating indicators.

SUMMARY OF THE INVENTION

The present invention comprises a weighing apparatus including a housing and a weighing mechanism carried by the housing. The housing includes a viewing region. The weighing apparatus further includes a load receiving platform for receiving a load to be weighed, and a dial bearing indicia for indicating the weight of the load received by the platform. An indicator moves relative to the dial in response to the weight of the load received by the platform, providing an indication corresponding to the weight of the load. A magnifier, which may be comprised of a transparent plastic material, is carried above the indicator and magnifies only a limited portion of the face of the dial in proximity to the indicator.

In a preferred embodiment, at least a portion of the magnifier means is positioned above the upper surface of the indicator means so as to magnify at least a portion of the upper surface of the indicator, in addition to magnifying the face of the dial.

Illumination means illuminate a limited portion of the face of the dial near the indicator. The illumination means includes a lamp carried by the lower surface of the indicator.

In another preferred embodiment, the weighing apparatus further includes switch means for actuating the illumination means upon a load being received by the platform. The switch means includes a partially open conductive ring including an open region, and a conductive arm. The conductive ring is attached to the indicator. The conductive arm is attached to the base. The conductive ring and the conductive arm are in a non-conductive orientation relative to each other when the weighing apparatus is in a non-load bearing state. Upon movement of the indicator from the non-load bearing state in response to the load received by the platform, the conductive ring and the conductive arm are in a connected, conductive orientation. Accordingly, electricity is supplied to the lamp only when a load is placed upon the platform.

BRIEF DESCRIPTION OF THE DRAWINGS

FIG. 1 of the drawings is a perspective view of the present weighing apparatus;

FIG. 2 of the drawings is an enlarged, fragmentary top plan / view of a portion of the weighing apparatus showing, in particular, the indicator means, the magnifying means, the illumination means, and a portion of the face of the dial;

FIG. 3 of the drawings is an enlarged, fragmentary crosssectional view of a portion of the weighing apparatus, taken generally along lines 3—3 of FIG. 1, showing, in particular, the conductive arm and the conductive ring;

FIG. 4 of the drawings is a perspective view of the conductive ring;

FIG. 5 of the drawings is a top plan view of the conductive ring showing, in particular, the power source and the switch coupled to the conductive ring; and FIG. 6 of the drawings is a bottom plan view of a portion of another embodiment of the present weighing apparatus showing, in particular, the partially open conductive ring.

DETAILED DESCRIPTION OF THE DRAWINGS

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Weighing apparatus 10 is shown in FIGS. 1–3 as comprising housing 20, weighing mechanism 21, viewing region 25, load receiving platform 30, dial 40, indicator means 50, magnifying means 60 and illuminating means 70. Dial 40 includes face 41, which is visible through viewing region 25 of housing 20. Dial face 41 bears indicia 42, including numerals 43 and tick marks 44, proximate to the circumference of the dial face.

Load receiving platform 30 receives a load to be weighed. Weighing mechanism 21 causes indicator means 50 to move relative to dial 40 in response to the placement of the load upon platform 30. The construction of analog scale spring weighing mechanism 21 is well known in the art. In particular, weighing mechanism 21 includes rack 22 and pinion 23. Rotating member 24 comprises a shaft attached through the proximate center of pinion 23. Upon the placement of a load on platform 30, weighing mechanism 21 causes rack 22 to move, and, in turn, pinion 23 and rotating member 24 to rotate in proportion to the weight of the load.

Pointer 53 is attached to indicator means 50 at the end of indicator means 50 proximate to the circumference of dial 40. Indicator means 50 is attached to rotating member 24 and rotates until pointer 53 comes to rest proximate to the specific indicia of dial face 41 which corresponds to the weight of the load placed upon the platform. In this manner, a visual indication is provided through viewing region 25 of the weight of the load presently placed upon platform 30.

Magnifying means 60, which may be formed from a clear plastic lens or any other material capable of serving as a magnifier, is carried for rotation with member 24 above indicator means 50. Magnifying means 60 extends over a portion of dial face 41 bearing indicia 42, so as to magnify the indicia in the limited area below the present position of pointer 53. In the preferred embodiment, the portion of magnifying means 60 proximate to dial indicia 42 is wider than indicator means 50 and pointer 53, so as to further magnify portions of the dial indicia 42 which surround the present position of indicator means 50 and pointer 53.

As shown in FIG. 3, indicator means 50 further includes a lower surface 51 proximate to the dial and an upper surface 52 distal from the dial. A portion of magnifying means 60 proximate to pointer 53 is carried vertically spaced above upper surface 52 of indicator means 50. This distal placement of magnifying means 60 with respect to indicator means 50 serves to magnify indicator means 50 and pointer 53, in addition to magnifying the dial indicia proximate to the present position of indicator means 50 and pointer 53.

Although, in the preferred embodiment, at least a portion of magnifying means 60 is spaced above indicator means 50, embodiments are also contemplated wherein magnifying means 60 is adjacent to, or integrated with, indicator means 50. For example, the indicator means may comprise a thin stripe painted on, or affixed to, magnifier 60, although increasing the distance between the indicator means and the dial may cause some parallax.

Cap 95 is affixed to the top of rotating member 24, so as to aid in retention of magnifying means 60 and indicator means 50 to rotating member 24. Cap 95 further serves to conceal rotating member 24, as viewed through viewing region 25, providing a more pleasing visual appearance.

Viewing region cover 26 (FIG. 3), attached to a portion of housing 20, protects the portions of weighing apparatus 10 located within viewing region 25 from accidental damage, and from dirt and other contaminants. Cover 26 is constructed from a transparent material so as not to obstruct the viewing of dial 40 or indicator means 50.

Weighing apparatus 10 further includes illumination means, including lamp 70, which serves to illuminate a limited portion of the dial indicia 76 in proximity to the present position of indicator means 50. Although the preferred embodiment of the present invention employs a lamp, other sources of visible light are contemplated, such as light-emitting diodes and fiber-optics.

Lamp 70 is carried by lower surface 51 of indicator means 50. Lamp 70 is positioned proximate to pointer 53 so as to illuminate only the indicia in the limited area proximate to pointer 53. Wire 84 provides electrical contact between one side of the filament of lamp 70 and conductor 77. Conductor 77 is in electrical contact with rotating member 24. Rotating member 24, which is constructed from a conductive material, is attached to electrical ground 83. A second wire 85 provides electrical contact between a second end of the filament of lamp 70 and conductive ring 71. Conductive ring 71 is attached to lower surface 51 of indicator means 50, substantially surrounding rotating member 24 but spaced from rotating member 24 so as to remain electrically isolated from rotating member 24, and hence from electrical ground, at all times.

A conductive arm 72 is shown in FIGS. 3, 4 and 5. Conductive arm 72 is attached to at least a portion of housing 20, by attachment to dial 40 which, in turn, is carried by housing 20. Attachment holes 75 permit attachment of conductive arm 72 to non-conductive housing 20 by means of screws, rivets, or the like. Alternatively, conductive arm 72 may be attached to housing 20 in any number of ways, including the use of adhesive bonding, heat staking, ultrasonic welding or the like.

In the preferred embodiment, conductive arm 72 has a substantially spiral shape as is best shown in FIG. 4. Conductive arm 72 includes a first end 73 and a second end 74. First end 73 of conductive arm 72 is proximate to dial 40 and hence, to a portion of housing 20. Conductive arm 72 is spaced from rotating member 24 and spirals about a portion of rotating member 24 from first end 73 to second end 74.

Second end 74 is spring biased into abutting electrical contact with conductive ring 71, such that conductive arm 72 remains in continuous electrical contact with conductive ring 71 during rotation of member 24 and conductive ring 71. Second end 74 and conductive ring 71 are aligned such that, regardless of the degree of rotation of indicator means 50 and rotating member 24, and hence of conductive ring 71, continuous contact, and a continuous electrical path, is maintained between conductive arm 72 and conductive ring 71. Accordingly, a continuous electrical path is also maintained between illumination means 70 and conductive arm 72, via second wire 85 and conductive ring 71.

Although, in the preferred embodiment, conductive arm 72 is shown as having a substantially spiral shape, other configurations of conductive arm 72 are contemplated, such as a substantially linear shape. The use of a substantially spiral shape for conductive arm 72, however, facilitates the use of a longer conductive arm, which, in turn, provides a more resilient spring-biased contact between conductive arm 72 and conductive ring 71.

Although the conductive member affixed to indicator means 50 is shown as being a conductive ring and the conductive member shown affixed to at least a portion of housing 20 is shown as being a conductive arm, other configurations are contemplated. For example, the positions of conductive ring 71 and conductive arm 72 may be reversed; i.e., conductive ring 71 may be attached to at least a portion of housing 20, and conductive arm 72 may be attached to indicator means 50.

Power source 80 shown in FIG. 5 supplies electricity to lamp 70. Power source 80 may comprise a battery, or may be derived from an external source of power, such as an AC outlet. Negative terminal 82 of power source 80 is connected to electrical ground 83 by means of wire 86. Positive terminal 81 of power source 80 is connected to conductive arm 72 by means of wire 87, switch 89 and wire 88. Switch 89 is provided so that lamp 70 does not continually draw power from power source 80. Rather, switch 89 is preferably closed only when a load is placed upon load bearing platform 30, such that lamp 70 is only illuminated only when the weighing apparatus is in use. Switch 89 may comprise a momentary, pressure-sensitive switch which is closed upon the placement of a load upon platform 30. Alternatively, switch 89 may comprise a manually operated switch.

Another embodiment of the present invention is shown in FIG. 6. In this embodiment, conductive ring 71 is replaced by partially open conductive ring 90, having an open region 91. Partially open conductive ring 90 is attached to indicator means 50, and aligned with respect to conductive arm 72 such that open region 91 aligns with the second end 74 of conductive arm 72 whenever indicator means 50 and pointer 53 point to numeral zero indicia 92 of dial face 41. Weighing mechanism 21 is calibrated such that indicator means 50 points to zero indicia 92 whenever platform 30 is in a non-load bearing state. Inasmuch as second end 74 of conductive arm 72 is aligned with open region 91 whenever platform 30 is in a non-load bearing stated, an open circuit is created between conductive arm 72 and partially open conductive ring 90, and lamp 70 is deactivated, whenever weighing apparatus 10 is not in use.

Upon placement of a load upon platform 30, rotating member 24 and indicator means 50, and hence partially open conductive ring 90, each rotate from their prior positions. Indicator means 50 no longer points to zero indicia 90, but rather points to a different indicia corresponding to the weight of the load placed upon the platform. Upon such rotation of indicator means 50, and hence partially open conductive ring 90, second end 74 of conductive arm 72 no longer aligns with open region 91. Instead, second end 74 of conductive arm 72 comes into contact with partially open conductive ring 90, creating a closed circuit between conductive arm 72 and lamp 70, via wire 85.

Accordingly, conductive arm 72 and partially opened conductive ring 90 function as an "automatic" switch, actuating lamp 70 upon the placement of a load upon platform 30. As a result, a separate switch, such as switch 89 in the other embodiment, is no longer required in order to actuate lamp 70. Thus, this embodiment requires fewer components, and fewer moving parts, than the embodiment shown in FIG. 5.

The foregoing description and drawings merely explain and illustrate the invention and the invention is not limited thereto except insofar as the appended claims are so limited, as those skilled in the art who have the disclosure before them will be able to made modifications and variations therein without departing from the scope of the invention.

What is claimed is:

1. A weighing apparatus comprising:

a housing;

a weighing mechanism carried by the housing;

the housing having a viewing region;

a load receiving platform operatively associate with the weighing mechanism for receiving a load to be weighed;

a dial, including a face associated with the viewing region, the face of the dial bearing indicia for indicating the weight of the load received by the platform;

indicator means for moving relative to the dial in response to the weight of the load received by the platform and for providing, in cooperation with the weighing mechanism and the indicia of the dial, an indication corresponding to the weight of the load; and magnifying means operatively associated with and movable with the indicator means for magnifying only a limited portion of the face of the dial in proximity to the indicator means.

2. The invention according to claim 1 wherein:

said indicator means includes a lower surface proximate to the dial and an upper surface distal from the dial; and at least a portion of said magnifying means is positioned above the upper surface of said indicator means so as to magnify at least a portion of the upper surface of said indicator means.

3. The invention according to claim 1 wherein:

the weighing apparatus further includes a rotating member, the rotating member rotating in response to the load received by the platform, the degree of rotation being dependent upon the weight of the load;

said indicator means being operably attached to the rotating member; and said indicator means being aligned with respect to the dial and the rotating member such that the position of said indicator means with respect to the indicia of the dial provides a visual identification of the weight of the load received by the platform.

4. The invention according to claim 3 wherein:

said magnifying means is operably attached to the rotating member; and at least a portion of said magnifying means is aligned with respect to at least a portion of said indicator means so as to magnify only a limited portion of the face of the dial in proximity to the indicator means.

5. The invention according to claim 4 wherein:

said indicator means includes a lower surface proximate to the dial and an upper surface distal from the dial; and at least a portion of said magnifying means is positioned above said upper surface of said indicator means so as to magnify at least a portion of said upper surface of said indicator means.

6. The invention according to claim 1 wherein said magnifying means is comprised of a transparent plastic material.

7. The invention according to claim 1 wherein said weighing apparatus further includes illumination means operatively associated with the indicator means for illuminating a limited portion of the face of the dial in proximity to the indicator means.

8. The invention according to claim 7 wherein:

the indicator means includes a lower surface proximate to the face side of the dial; and the illumination means includes a lamp attached to the lower surface of the indicator means.

9. The invention according to claim 7 wherein:

the illumination means includes conducting means operatively associated with the indicator means and at least a portion of the housing for providing an electrically conductive path between at least a portion of the housing and at least a portion of the indicator means, the conducting means comprising:

a first member operatively associated with the indicator means and a second member operatively associated with the housing; and the first and second member being in continuous electrical contact, regardless of the movement of the indicator means.

10. The invention according to claim 9 wherein:

the weighing apparatus further includes a rotating member, the rotating member rotating in response to the load received by the platform, the degree of rotation being dependent upon the weight of the load;

said indicator means being operably attached to the rotating member;

the first member comprises a conductive ring attached to said indicator means in a position surrounding the rotating member;

the second member comprises a conductive arm including a first end and a second end;

the first end of the conductive arm being attached to at least a portion of the housing; and the conductive arm being spring-biased and positioned such that at least a portion of the conductive arm proximate to the second end remains in continuous electrical contact with the conductive ring.

11. The invention according to claim 10 wherein said conductive arm has a substantially spiral shape.

12. The invention according to claim 7 wherein:

the illumination means includes conducting means operatively associated with the indicator means and at least a portion of the housing for providing an electrically conductive path between at least a portion of the housing and at least a portion of the indicator means, the conducting means comprising:

a first member operatively associated with the indicator means and a second member operatively associated with the housing, the first and second members being in a non-connected, non-conductive orientation relative to each other when the weighing apparatus is in a non-load bearing state, and the first and second members being in a connected, conductive orientation relative to each other upon movement of the indicator means from the non-load bearing state in response to the load received by the platform.

13. The invention according to claim 12 wherein:

the weighing apparatus further includes a rotating member, the rotating member rotating in response to the load received by the platform, the degree of rotation being dependent upon the weight of the load;

said indicator means being operably attached to the rotating member;

the first member comprises a partially open conductive ring including an open region;

the partially open conductive ring being attached to the indicator means in a position substantially surrounding the rotating member;

the second member comprises a conductive arm including a first end and a second end;

the first end of the conductive arm being attached to at least a portion of the housing;

the partially open conductive ring being oriented relative to the conductive arm such that the open region aligns with the second end of the conductive arm when the weighing apparatus is in a non-load bearing state, wherein an open circuit is created between the conductive arm and the partially open conductive ring.

14. The invention according to claim 9 wherein said conductive arm has a substantially spiral shape.

15. The invention according to claim 1 wherein the indicator means comprises a rotating pointer and the magnifying means is carried above at least a portion of the pointer.

16. The invention according to claim 15 wherein the pointer rotates and the magnifying means rotates together with the pointer.

17. A weighing apparatus comprising:

a housing;

a weighing mechanism carried by the housing;

the housing having a viewing region;

a load receiving platform operatively associated with the weighing mechanism for receiving a load to be weighed;

a dial, including a face associated with the viewing region, the face of the dial bearing indicia for indicating the weight of the load received by the platform;

indicator means for moving relative to the dial in response to the weight of the load received by the platform end for providing, in cooperation with the weighing mechanism and the indicia of the dial, an indication corresoonding to the weight of the load;

illumination means for illuminating at least a portion of the face of the dial in proximity to the indicator means;

switch means for actuating the illumination means upon the load being received by the platform;

the switch means including a first member operatively associated with the indicator means and a second member operatively associated with the housing;

the first and second member being in a non-connected, non-conductive orientation relative to each other when the weighing aooaratus is in a non-load bearing state;

the first and second member being in a connected, conductive orientation relative to each other upon movement of the indicator means from the non-load bearing state in response to the load received by the platform;

the indicator means including a rotating member, the rotating member rotating in response to the load received by the platform, the degree of rotation being dependent upon the weight of the load received by the platform;

the first member comprising a partially open conductive ring including an open region;

the partially open conductive ring being attached to the indicator means in a position substantially surrounding the rotating member;

the second member comprising a conductive arm including a first end and second end;

the first end of the conductive arm being attached to at least a portion of the housing;

the conductive arm being spring-biased and positioned such that at least a portion of the conductive arm proximate to the second end remains in electrical contact with the partially open conductive ring when the apparatus is in a load-bearing state; and the partially open conductive ring being oriented relative to the conductive arm such that the open region aligns with the second end of the conductive arm when the weighing apparatus is in the non-load bearing state, wherein an open circuit is created between the conductive arm and the partially open conductive ring.

18. The invention according to claim 17 wherein said conductive arm has a substantially spiral shape.

* * * * *

UNITED STATES PATENT AND TRADEMARK OFFICE
CERTIFICATE OF CORRECTION

PATENT NO. : 5,631,448
DATED : May 20, 1997
INVENTOR(S) : Rabinowitz et al

It is certified that error appears in the above-identified patent and that said Letters Patent is hereby corrected as shown below:

Col. 3, line 9    Delete "crosssectional" and insert instead -- cross-sectional --.

Col. 8, line 57   Delete "corresoonding" and insert instead -- corresponding --.

Col. 8, line 67   Delete "aooaratus" and insert instead -- apparatus --.

Signed and Sealed this

Third Day of February, 1998

Attest:

BRUCE LEHMAN

Attesting Officer    Commissioner of Patents and Trademarks